United States Patent
Anselmi et al.

(10) Patent No.: US 8,117,481 B2
(45) Date of Patent: *Feb. 14, 2012

(54) APPARATUS AND METHOD FOR PROCESSING WIRELESSLY COMMUNICATED INFORMATION WITHIN AN ELECTRONIC DEVICE

(75) Inventors: Bruno Anselmi, Ruegsau (CH); Marcel Frikart, Bern (CH); Jean-Noel Fehr, Neuenburg (CH); Urs Anliker, Gumligen (CH); Thomas Von Buren, Bern (CH); Urban Schnell, Munchenburchsee (CH); Christoph Rickert, Reinach (CH)

(73) Assignee: Roche Diagnostics International AG (CH)

( * ) Notice: Subject to any disclaimer, the term of this patent is extended or adjusted under 35 U.S.C. 154(b) by 845 days.

This patent is subject to a terminal disclaimer.

(21) Appl. No.: 12/134,960

(22) Filed: Jun. 6, 2008

(65) Prior Publication Data
US 2009/0307520 A1    Dec. 10, 2009

(51) Int. Cl.
*G06F 1/00* (2006.01)
(52) U.S. Cl. .......................... 713/400; 713/375
(58) Field of Classification Search .................. 713/375, 713/400, 401
See application file for complete search history.

(56) References Cited

U.S. PATENT DOCUMENTS

| | | | |
|---|---|---|---|
| 4,539,655 A * | 9/1985 | Trussell et al. | 710/100 |
| 5,582,593 A | 12/1996 | Hultman | |
| 5,665,065 A | 9/1997 | Colman et al. | |
| 5,925,021 A | 7/1999 | Castellano et al. | |
| 6,427,088 B1 | 7/2002 | Bowman, IV et al. | |
| 6,540,672 B1 | 4/2003 | Simonsen et al. | |
| 6,551,276 B1 | 4/2003 | Mann et al. | |
| 6,554,798 B1 | 4/2003 | Mann et al. | |
| 6,562,001 B2 | 5/2003 | Lebel et al. | |
| 6,564,105 B2 | 5/2003 | Starkweather et al. | |
| 6,571,128 B2 | 5/2003 | Lebel et al. | |
| 6,577,899 B2 | 6/2003 | Lebel et al. | |
| 6,585,644 B2 | 7/2003 | Lebel et al. | |
| 6,634,014 B1 | 10/2003 | Lindberg et al. | |
| 6,648,821 B2 | 11/2003 | Lebel et al. | |
| 6,650,951 B1 | 11/2003 | Jones et al. | |
| 6,659,948 B2 | 12/2003 | Lebel et al. | |

(Continued)

FOREIGN PATENT DOCUMENTS
EP          1109586 A2    6/2001
(Continued)

OTHER PUBLICATIONS

Paradigm Pump Manual, User Guide, 2006, Medtronic MiniMed (176 pages).

*Primary Examiner* — M Elamin
(74) *Attorney, Agent, or Firm* — Barnes & Thornburg LLP (57) ABSTRACT

An electronic device (12) for processing information wirelessly received from another electronic device (14) or to be wirelessly sent to the another electronic device (14) may include a first processor (20) that controls only wireless communications with the another electronic device (14) and excluding operations associated only with the electronic device (12), a second processor (16) that controls the operations associated only with the electronic device (12) and excluding the wireless communications with the another device (14), and a clock circuit (24, 190) that is separate and independent from the first and second processors (20, 16) and that produces at least one timing signal that regulates synchronous exchange of the information between the first and second processors (20, 16).

17 Claims, 7 Drawing Sheets

U.S. PATENT DOCUMENTS

| | | |
|---|---|---|
| 6,668,196 B1 | 12/2003 | Villegas et al. |
| 6,687,546 B2 | 2/2004 | Lebel et al. |
| 6,694,191 B2 | 2/2004 | Starkweather et al. |
| 6,733,446 B2 | 5/2004 | Lebel et al. |
| 6,738,670 B1 | 5/2004 | Almendinger et al. |
| 6,740,075 B2 | 5/2004 | Lebel et al. |
| 6,744,350 B2 | 6/2004 | Blomquist |
| 6,758,810 B2 | 7/2004 | Lebel et al. |
| 6,768,425 B2 | 7/2004 | Flaherty et al. |
| 6,810,290 B2 | 10/2004 | Lebel et al. |
| 6,811,533 B2 | 11/2004 | Lebel et al. |
| 6,811,534 B2 | 11/2004 | Bowman, IV et al. |
| 6,813,519 B2 | 11/2004 | Lebel et al. |
| 6,872,200 B2 | 3/2005 | Mann et al. |
| 6,873,268 B2 | 3/2005 | Lebel et al. |
| 6,936,029 B2 | 8/2005 | Mann et al. |
| 6,950,708 B2 | 9/2005 | Bowman, IV et al. |
| 6,958,705 B2 | 10/2005 | Lebel et al. |
| 6,974,437 B2 | 12/2005 | Lebel et al. |
| 6,979,326 B2 | 12/2005 | Mann et al. |
| 6,997,920 B2 | 2/2006 | Mann et al. |
| 7,024,245 B2 | 4/2006 | Lebel et al. |
| 7,109,878 B2 | 9/2006 | Mann et al. |
| 7,171,274 B2 | 1/2007 | Starkweather et al. |
| 7,179,226 B2 | 2/2007 | Crothall et al. |
| 7,204,823 B2 | 4/2007 | Estes et al. |
| 7,278,983 B2 | 10/2007 | Ireland et al. |
| 7,347,819 B2 | 3/2008 | Lebel et al. |
| 7,369,635 B2 | 5/2008 | Spital et al. |
| 2002/0095596 A1* | 7/2002 | Williams ............ 713/200 |
| 2002/0129292 A1* | 9/2002 | Kaneko ............ 713/400 |
| 2003/0032867 A1 | 2/2003 | Crothall et al. |
| 2003/0065308 A1 | 4/2003 | Lebel et al. |
| 2003/0065536 A1 | 4/2003 | Hansen et al. |
| 2003/0163088 A1 | 8/2003 | Blomquist |
| 2003/0176933 A1 | 9/2003 | Lebel et al. |
| 2003/0212364 A1 | 11/2003 | Mann et al. |
| 2003/0212441 A1 | 11/2003 | Starkweather et al. |
| 2004/0029562 A1* | 2/2004 | Sharon et al. ............ 455/410 |
| 2004/0044272 A1 | 3/2004 | Moerman et al. |
| 2004/0068230 A1 | 4/2004 | Estes et al. |
| 2004/0078550 A1* | 4/2004 | Chauvel et al. ............ 712/34 |
| 2004/0193090 A1 | 9/2004 | Lebel et al. |
| 2004/0225338 A1 | 11/2004 | Lebel et al. |
| 2004/0235446 A1 | 11/2004 | Faherty et al. |
| 2004/0260233 A1 | 12/2004 | Garibotto et al. |
| 2005/0003470 A1 | 1/2005 | Nelson et al. |
| 2005/0009126 A1 | 1/2005 | Andrews et al. |
| 2005/0010269 A1 | 1/2005 | Lebel et al. |
| 2005/0022274 A1 | 1/2005 | Campbell et al. |
| 2005/0065464 A1 | 3/2005 | Talbot et al. |
| 2005/0090808 A1 | 4/2005 | Malave et al. |
| 2005/0136992 A1* | 6/2005 | Mueller ............ 455/574 |
| 2005/0171513 A1 | 8/2005 | Mann et al. |
| 2005/0215982 A1 | 9/2005 | Malave et al. |
| 2006/0132292 A1 | 6/2006 | Blomquist |
| 2006/0173444 A1 | 8/2006 | Choy et al. |
| 2006/0198364 A1* | 9/2006 | Fujii ............ 370/352 |
| 2007/0060869 A1 | 3/2007 | Tolle et al. |
| 2007/0060870 A1 | 3/2007 | Tolle et al. |
| 2007/0060871 A1 | 3/2007 | Istoc et al. |
| 2007/0153705 A1 | 7/2007 | Rosar et al. |
| 2008/0033357 A1 | 2/2008 | Mann et al. |
| 2008/0288550 A1* | 11/2008 | Wang et al. ............ 707/200 |

FOREIGN PATENT DOCUMENTS

| | | |
|---|---|---|
| EP | 1347705 A2 | 1/2003 |
| EP | 0830160 B1 | 3/2003 |
| EP | 1423046 A2 | 6/2004 |
| EP | 1473050 A1 | 11/2004 |
| EP | 1611834 A2 | 1/2006 |
| EP | 1135056 B1 | 8/2006 |
| EP | 1759726 A2 | 3/2007 |
| GB | 2389419 A | 6/2002 |
| WO | WO0228454 A2 | 4/2002 |
| WO | WO03005278 A1 | 1/2003 |
| WO | WO03009207 A1 | 1/2003 |
| WO | WO03009208 A1 | 1/2003 |
| WO | WO03015838 A2 | 2/2003 |
| WO | WO-2004008956 A2 | 1/2004 |
| WO | WO2004098390 A2 | 11/2004 |
| WO | WO2007021892 A1 | 2/2007 |
| WO | WO2007021894 A2 | 2/2007 |
| WO | WO-2008097316 A1 | 8/2008 |

* cited by examiner

APPARATUS AND METHOD FOR PROCESSING WIRELESSLY COMMUNICATED INFORMATION WITHIN AN ELECTRONIC DEVICE

FIELD OF THE INVENTION

The present invention relates generally to electronic devices configured to wirelessly communicate with other electronic devices, and more specifically to processing wirelessly communicated information within either or both of the electronic devices.

BACKGROUND

It is generally known to provide for wireless communications between two electronic devices such as a medical device, e.g., an ambulatory medical device, and a remote electronic device. It is desirable with such arrangements to separate the control of telemetry operations from device function operations within either or both of the wirelessly communicating devices.

SUMMARY

The present invention may comprise one or more of the features recited in the attached claims, and/or one or more of the following features and combinations thereof. An electronic device for processing information wirelessly received from another electronic device or to be wirelessly sent to the another electronic device may comprise a first processor that controls only wireless communications with the another electronic device and excluding operations associated only with the electronic device, a second processor that controls the operations associated only with the electronic device and excluding the wireless communications with the another device, and a clock circuit that is separate and independent from the first and second processors and that produces at least one timing signal that regulates synchronous exchange of the information between the first and second processors.

In one embodiment, the clock circuit may be a real time clock circuit and the at least one timing signal may include a timing reference signal. The first and second processors may each comprise internal timing information. The first and second processors may each synchronize their internal timing information to the timing reference signal.

The first and second processors may each comprise one or more internal timers and a time base. The first and second processors may each update their one or more internal timers and time base with the timing reference signal prior to synchronizing their internal timing information to the timing reference signal.

The first and second processors may each be configured to request the timing reference signal from the real time clock circuit prior to exchange of the information between the first and second processors. The first and second processors may each be configured to request the timing reference signal at different instants in time relative to each other.

In another illustrative embodiment, the clock circuit may be a clock generator and the at least one timing signal may include at least one clock signal. The first and second processors may each exchange the information according to the at least one clock signal.

The information exchanged between the first and second processor may comprise one or more information packets that each include a number of data bits. The at least one clock signal may comprise a data bit clock signal by which each of the number of data bits of an information packet is exchanged between the first and second processors.

The at least one timing signal may further include an information packet clock signal by which each information packet is exchanged between the first and second processors.

The first processor may comprise a communication processor that controls wireless communications with the another electronic device, and a first kernel processor that exchanges information between the communication processor and the second processor according to the at least one timing signal.

The second processor may comprise a main processor that controls the operations associated only with the electronic device, and a second kernel processor that exchanges information between the main processor and the first kernel processor according to the at least one timing signal.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
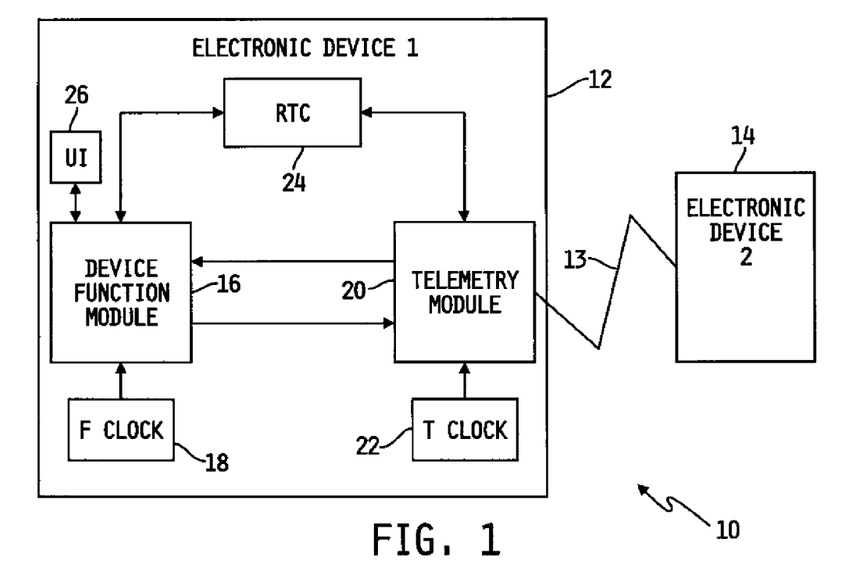
FIG. 1 is a diagram of one illustrative embodiment of a wireless communication system configured for wireless communications between two separate electronic devices.

Referring now to FIG. 1, one illustrative embodiment of a wireless communication system 10 is shown that is configured for wireless communications between two separate electronic devices 12 and 14. In one illustrative embodiment, the electronic device 12 is a medical device and the electronic device 14 is a remote electronic device. In this embodiment, the medical device 12 may be, for example, an ambulatory medical device, although the medical device 12 may alternatively be or include a non-ambulatory medical device.

Examples of such an ambulatory medical device may include, but should not be limited to, one or any combination of a medication or drug delivery device such as an infusion pump, a glucose meter, a body fluid analyte sensor system including one or more subcutaneous and/or implanted body fluid analyte sensors, a remote terminal representing a remote infusion pump display on which data from the infusion pump is displayed to a user, or the like. The remote electronic device 14, in this embodiment, may be or include, but should not be limited to, a conventional personal data assistant (PDA) device, an application-specific remote electronic device that may be hand-held, attachable or mountable to clothing, configured to be worn by a person such as on or about a limb or portion thereof, on or about a head or portion thereof, or on or about a body or portion thereof, attachable to a key ring, or the like, a portable wireless communication device with an on-board glucose meter, a smart phone, a personal computer (PC), a laptop, notebook or similar computer, or the like. In one specific embodiment, which should not be considered to be limiting in any way, the electronic device 12 is an insulin infusion pump and the remote electronic device 14 is a hand-held smart phone. In other embodiments, the functionality of the electronic devices 12 and 14 may be reversed, i.e., the electronic device 14 may be a medical device, ambulatory or otherwise, and the electronic device 12 may be a remote electronic device. In still other embodiments, the electronic devices 12 and 14 may both be medical devices, ambulatory or otherwise, and in further embodiments the electronic devices 12 and 14 may both be non-medical electronic devices.

In the illustrated embodiment, the electronic device 12 includes a device function module 16 that is configured to control all functional operations of the device 12 but not including telemetry operations, i.e., wireless communications with the electronic device 14. A clock circuit, F CLOCK, 18 is electrically connected to the device function module 16, and the timing of operation of the device function module 16 is controlled by the clock circuit 18. The device function module 16 is also electrically connected to a user interface, UI, 26. The electronic device 12 further includes a telemetry module 20 that is electrically connected to the device function module 16. The telemetry module 20 is configured to control wireless communication with the electronic device 14, but not device functions, i.e., non-telemetry operations of the electronic device 12. Another clock circuit, T CLOCK, 22 is electrically connected to the telemetry module 20, and the timing of operation of the telemetry module 20 is controlled by the clock circuit 22. The electronic device 12 further includes a real time clock circuit, RTC, 24 that is electrically connected to the device function module 16 and to the telemetry module 20. The real time clock 24 operates to synchronize information transfer between the device function module 16 and the telemetry module 20 such that neither the device function module 16 nor the telemetry module 20 controls information transfer between the two modules 16, 20. Control of the functions of the electronic device 12 and of the telemetry operations are thus separate and independent of each other.

The electronic device 14 may or may not be configured identically as just described with respect to the electronic device 12, and in any case the electronic devices 12 and 14 are configured to communicate wirelessly with each other via a conventional communication medium 13. Examples of the communication medium 13 may include, but should not be limited to, radio frequency (RF), infrared (IR), microwave, inductive coupling, or the like. In one specific example, which should not be considered limiting in any way, the electronic devices 12 and 14 are each configured to communicate via RF according to a conventional BlueTooth® radio frequency communications protocol.

Figure 2:
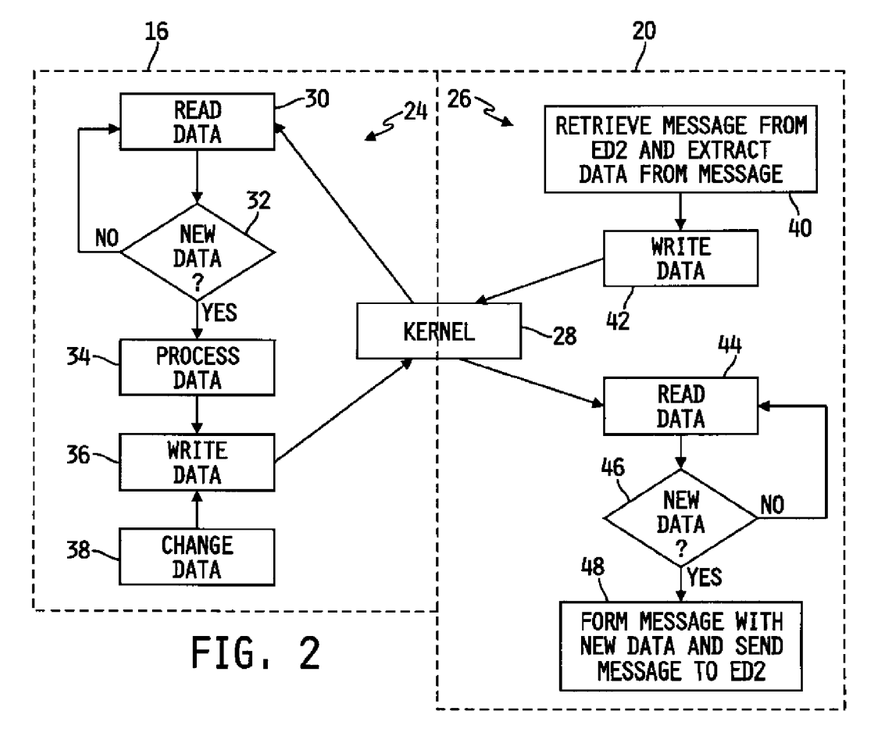
FIG. 2 is a flowchart of one illustrative embodiment of a process for managing wirelessly communicated information within either or both of the electronic devices of FIG. 1.

Referring now to FIG. 2, a flowchart is shown of one illustrative embodiment of a process for managing wirelessly communicated information within either or both of the electronic devices 12, 14. The illustrated process comprises two sub-processes 24 and 26 that are carried out within the device function module 16 and the telemetry module 20 respectively. The process illustrated in FIG. 2 manages information exchange between the device function module 16 and the telemetry module 20 via a communication kernel 28. As illustrated by dashed-line representation in FIG. 2, a portion of the communication kernel 28 resides in the device function module 16 and the remaining portion resides in the telemetry module 20. However, the communication kernel 28 operates independently of either of the device function module 16 and the telemetry module 20.

Via the communication kernel 28, a continuous information packet exchange takes place between the device function module 16 and the telemetry module 20. This is accomplished by exchanging information packets when the device function module 16 is sending information to the telemetry module 20, the telemetry module 20 is sending information to the device function module 16 and also when neither of the modules 16, 20 is sending information to the other. When no information is being sent by either of the modules 16, 20 to the other, each send dummy information packets. Illustratively, the dummy information packets may comprise the last information packet sent by the respective module 16, 20, or may alternatively comprise a null packet, a predefined information packet or other suitable packet.

Illustratively, each information packet sent by either the device function module 16 or the telemetry module 20 includes a data field that contains actual data when information is being sent and otherwise contains dummy data as just described. Each information packet may further include a header having a number of header bits that contain information relating to the packet and/or data contained therein. Each information packet may further include a checksum, such as a cyclic redundancy check (CRC), to provide for data integrity checks.

The sub-process 24 for managing by the device function module 16 of information exchange with the telemetry module 20 via the communication kernel 28 begins at step 30 where the device function module 16 reads data in the form of an information packet from the kernel 28. Thereafter at step 32, the device function module 16 conducts an analysis of the data read at step 30 to determine whether the data is new, i.e., whether the device function module 16 has previously read the data contained in the information packet. If not, the device function module 16 may or may not write data, e.g., status data to the kernel 28, and the sub-process 24 loops back to step 30. If instead the device function module 16 determines that the information packet read at step 30 contains new data, it is processed by the device function module 16 at step 34 and any results, e.g., commands or data, generated by the processing of the new data and/or any changed data from step 38 are written by the device function module 16 to the kernel 28 at step 36. The device function module 16 periodically executes the sub-process 24 independently of the timing of operation of the kernel and also independently of the timing of operation of the telemetry module 20.

The sub-process 26 for managing by the telemetry module 20 of information exchange with the device function module 16 via the communication kernel 28 begins at step 40 where the telemetry module 20 wirelessly receives a message from the electronic device 14 via the communication link 13 and extracts the information packet from the wireless communication protocol structure. Thereafter at step 42, the telemetry module 20 writes the extracted information packet to the communication kernel 28. In carrying out steps 40 and 42, the telemetry module does not read, interpret or act upon any substantive data contained in the information packet, but rather only extracts the information packet from the communication protocol structure, e.g., unpacks it from the Blue-Tooth® communication protocol structure, and writes the packet to the communication kernel 28. In alternative embodiments, the sub-process 26 for managing by the telemetry module 20 of information exchange with the device function module 16 via the communication kernel 28 may begin at step 44 where the telemetry module reads data in the form of an information packet from the kernel 28.

At step 44, the telemetry module 20 reads data in the form of an information packet from the kernel 28. Thereafter at step 46, the telemetry module 20 conducts an analysis of the data read from the communication kernel 28 at step 44 to determine whether the data is new, i.e., whether the telemetry module 20 has previously read the data contained in the information packet. It will be understood that at step 44, the analysis undertaken by the telemetry module 20 at step 46 is determines only whether the data contained in the information packet is new, i.e., has not been read by the telemetry module 20 before, and does not interpret or act upon the instructions or information contained in the data. If the telemetry module 20 determines at step 46 that the data is not new, the telemetry module 16 does not wirelessly transmit anything to the electronic device 14. On the other hand, if the telemetry module 20 determines at step 46 that the information packet read from the communication kernel 28 at step 44 contains new data, the telemetry module 20 packs the information packet into the wireless communication protocol structure and wirelessly transmits the information packet to the electronic device 14 at step 48.

At steps 32 and 46, the device function module 16 and the telemetry module 20 respectively analyze data contained in the information packet read from the communication kernel 28 to determine whether the information packet contains new data. In one embodiment, this is accomplished by implementing a bitwise comparison with the previously read information packet and, if at least one bit of the compared packets differs, the information packet is considered new. In one alternative embodiment, the header of the information packet may contain a count value or a set of random bits, and the modules 16, 20 may be configured in this embodiment to determine whether an information packet contains new data by analyzing the header to determine whether the count value or set of random bits differs from that or those of the previous information packet. Those skilled in the art will recognize other conventional techniques for determining whether an information packet contains new data, and any such other techniques are contemplated by this disclosure.

Figure 3:
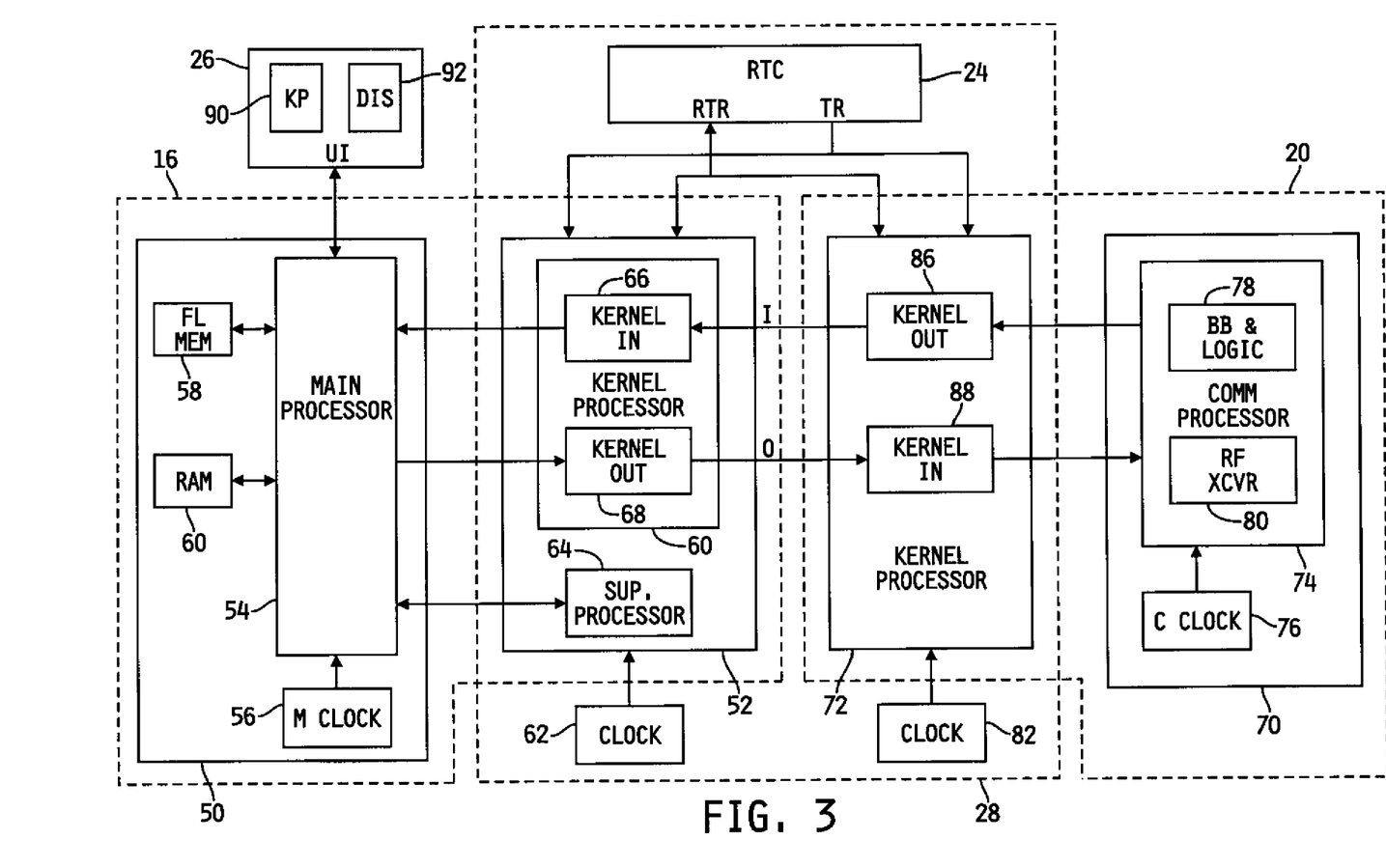
FIG. 3 is a diagram of one illustrative embodiment of the device function and telemetry modules of FIG. 1.

Referring now to FIG. 3, a diagram of one illustrative embodiment of the device function and telemetry modules 16 and 20 respectively is shown. In the illustrated embodiment, the device function module 16 includes three separate processor circuits. A main processor circuit 50 includes a main processor 54 that is electrically connected to a non-volatile memory 58, e.g., a conventional FLASH memory, a volatile memory 60, e.g., a random access memory (RAM) and a main clock circuit 56. The main processor 54 may be, for example, a model V850SA1, 32-bit microcontroller that is commercially available from NEC corporation, although the main processor 54 may alternatively be implemented using other conventional microprocessor-based or non-microprocessor-based circuits.

The device function module 16 further includes a kernel processor module 52 that is electrically connected to the real time clock 24 and also to a kernel clock circuit 62. Illustratively, the kernel clock circuit 62 and the main clock circuit 56 comprise the clock circuit 18 illustrated in FIG. 1. The kernel processor module 52 illustratively includes a kernel processor 60 and a supervisor processor 64. The kernel processor 60 may be, for example, a model MSP430F2471, 16-bit microcontroller that is commercially available from Texas Instruments, although the kernel processor 60 may alternatively be implemented using other conventional microprocessor-based or non-microprocessor-based circuits. The supervisor processor 64 may be, for example, a model PIC12C509, 8-bit microcontroller that is commercially available from Microchip Technology, Inc., although the supervisor processor 64 may alternatively be implemented using other conventional microprocessor-based or non-microprocessor-based circuits. Generally, the kernel processor 60 controls data flow between the main processor 54 and the telemetry module 20 using timing information provided by the real time clock 24, as will be described in greater detail hereinafter, and the supervisor processor 64 continually monitors the main processor 54 and activates an alarm if the main processor 54 malfunctions. In alternative embodiments, the kernel processor 60 and the supervisor processor 64 may be implemented as a single processor, one example of which may be a model MSP430F2471, 16-bit microcontroller as described above. In other alternative embodiments, the main processor 54 and the kernel processor 60 may be implemented as a single processor, one example of which may be a model V850SA1, 32-bit microcontroller that is commercially available from NEC Corporation as described above. In an alternative embodiment, the device function module 16 may include a main module that includes the main processor 50, one example of which may be a model V850SA1, 32-bit microcontroller that is commercially available from NEC Corporation as described above, and the supervisor processor 64, one example of which may be a model PIC12C509, 8-bit microcontroller that is commercially available from Microchip Technology, Inc. as described above, and a kernel module including the kernel processor 60, one example of which may be a model MSP430F2471, 16-bit microcontroller as described above.

Illustratively, the kernel processor 60 is partitioned into a kernel IN portion 66 and a kernel OUT portion 68. The kernel IN portion 66 designates the flow and storage of information packets from the telemetry module 20 to the main processor 54, and the kernel OUT portion 68 designates the flow and storage of information packets from the main processor 54 to the telemetry module 20. For purposes of this disclosure, information packets passing from the telemetry module 20 to the device function module 16 will be referred to as inbound information packets, and information packets passing from the device function module 16 to the telemetry module 20 will be referred to as outbound information packets.

In the illustrated embodiment, the telemetry module 20 includes two separate processor circuits. A communication processor circuit 70 includes a communication processor 74 that is electrically connected to a communication clock circuit 76. The communication processor 74 illustratively includes a conventional base band and logic section 78 and a conventional radio frequency (RF) transceiver circuit. In one embodiment, the communication processor 74 includes a main processor and a separate wireless communication processor. In one example of this embodiment in which the wireless communication protocol is a BlueTooth® RF communications protocol, the wireless communication processor may, for example, be a BlueCore 4-ROM Plug-N-Go, single chip radio and baseband circuit that is commercially available from a number of suppliers such as CSR, and the main processor may be, for example, a model MSP430F2471 16-bit microcontroller as described above. In this example embodiment, the wireless communication processor handles the BlueTooth® communications, i.e., the lower layer of the BlueTooth® protocol stack, and the main processor handles the upper layer of the BlueTooth® protocol stack and, in some embodiments, an additional security layer. In alternative embodiments, the main processor and the wireless communication processor may be substituted by a single processor, e.g., a single BlueCore 4-ROM Plug-N-Go, single chip radio and baseband circuit.

The telemetry module 20 further includes a kernel processor 72 that is electrically connected to the real time clock 24 and also to a kernel clock circuit 82. Illustratively, the kernel clock circuit 82 and the communication clock circuit 76 comprise the clock circuit 22 illustrated in FIG. 1. The kernel processor 72 may be, for example, a model MSP430F2471, 16-bit microcontroller that is commercially available from Texas Instruments, although the kernel processor 72 may alternatively be implemented using other conventional microprocessor-based or non-microprocessor-based circuits. Generally, the kernel processor 72 controls data flow between the communication processor 74 and the device function module 16 using timing information provided by the real time clock 24, as will be described in greater detail hereinafter. In alternative embodiments, the kernel processor 72 and the wireless communication processor may be implemented as a single processor, and in other embodiments, the kernel processor 72 and the entire communication processor 74 may be implemented as a single processor. In either case, one example of such a single processor may be a single BlueCore 4-ROM Plug-N-Go, single chip radio and baseband circuit as described above. In alternative embodiments, the kernel processor 72 and the main processor of the communication processor 74 may be implemented as a single processor. In this case, one example of such a single processor may be a single MSP430F1611, 16-bit microcontroller that is commercially available from Texas Instruments.

Illustratively, the kernel processor 72 is partitioned into a kernel OUT portion 86 and a kernel IN portion 88. The kernel OUT portion 86 designates the flow and storage of information packets from the communication processor 74 to the device function module 16, and the kernel IN portion 88 designates the flow and storage of information packets from the device function module 16 to the communication processor 74. As illustrated in FIG. 3 by dashed-line representation, the real time clock circuit 24, the kernel processor module 52 and the clock circuits 62 and 82 comprise the kernel 28 illustrated and described with respect to FIG. 2. In one embodiment, the kernel processor module 52 and the kernel processor 72 are electrically connected together via a single, bidirectional serial data link. Alternatively, the kernel processor module 52 and the kernel processor 72 may be electrically connected via two or more unidirectional data links, serial or otherwise.

The real time clock circuit 24 has a read time reference input, RTR, and a time reference output, TR, both of which are electrically connected to the kernel processor module 52 and to the kernel processor 72. In one embodiment, the real time clock circuit 24 is electrically connected to the kernel processor module 52 and to the kernel processor 72 via a conventional inter-integrated circuit ($I^2C$), multi-master serial communication bus, although this disclosure contemplates using other conventional electrical connection schemes. The real time clock circuit 24 includes conventional real time clock circuitry and additional logic that is responsive to a read signal applied to the RTR input to produce a time reference value, e.g., a real time value, at the time reference output, TR. In one embodiment, the real time clock circuit 24 is configured to support an alarm resolution and a time resolution of less than or equal to one second.

The user interface 26 is illustrated in FIG. 3 as including a conventional key pad 90 and a conventional display unit 92. The key pad 90 may be or include one or more special purpose keys or buttons, a conventional full-function key board such as those typically found on a personal, laptop or notebook computer, or some number of keys or buttons between one key or button and a full-function key board. The display unit 92 may be a conventional liquid crystal display (LCD) unit, or may alternatively be or include a conventional vacuum fluorescent display unit, a conventional light emitting diode (LED) display, one or more conventional light emitting diodes or segments, or the like. Alternatively or additionally, the user interface 26 may include one or more additional information input devices for providing information from a user or another electronic system to the electronic device 12. Examples of such one or more additional information input devices include, but should not be limited to, a conventional touch-screen display, conventional voice-activated information input circuitry, a conventional wired or wireless data port configured to communicate with an external electronic system or the like. Alternatively or additionally still, the user interface 26 may include one or more other notification or information transfer devices for providing information to a user or other electronic system. Examples of such one or more other notification or information transfer devices include, but should not be limited to, a conventional audio indication device, one or more conventional speakers, one or more conventional tactile indication devices, a conventional wired or wireless data port configured to communicate with an external electronic system or the like.

As described hereinabove, the device function module 16 and the telemetry module 20 are separate and independent of each other. The device function module 16 controls only the functions and operations of the electronic device 12 that are not telemetry related, and the telemetry module 20 controls only the telemetry operations. In particular, any information packet sent by the electronic device 14 to the electronic device 12 or sent by the device function module 16 to the telemetry module 20, is forwarded unchanged by the telemetry module 20 to the intended recipient. Moreover, the device function module 16 and the telemetry module 20 both read data from, and write data to, the communication kernel 28 according to their own internal clock with no direct interaction between the modules 16, 20 for clock synchronization. Rather, both modules 16, 20, independently from each other, align their internal clocks with the real time clock 24 to indirectly synchronize communication between the two modules 16, 20.

Figure 4:
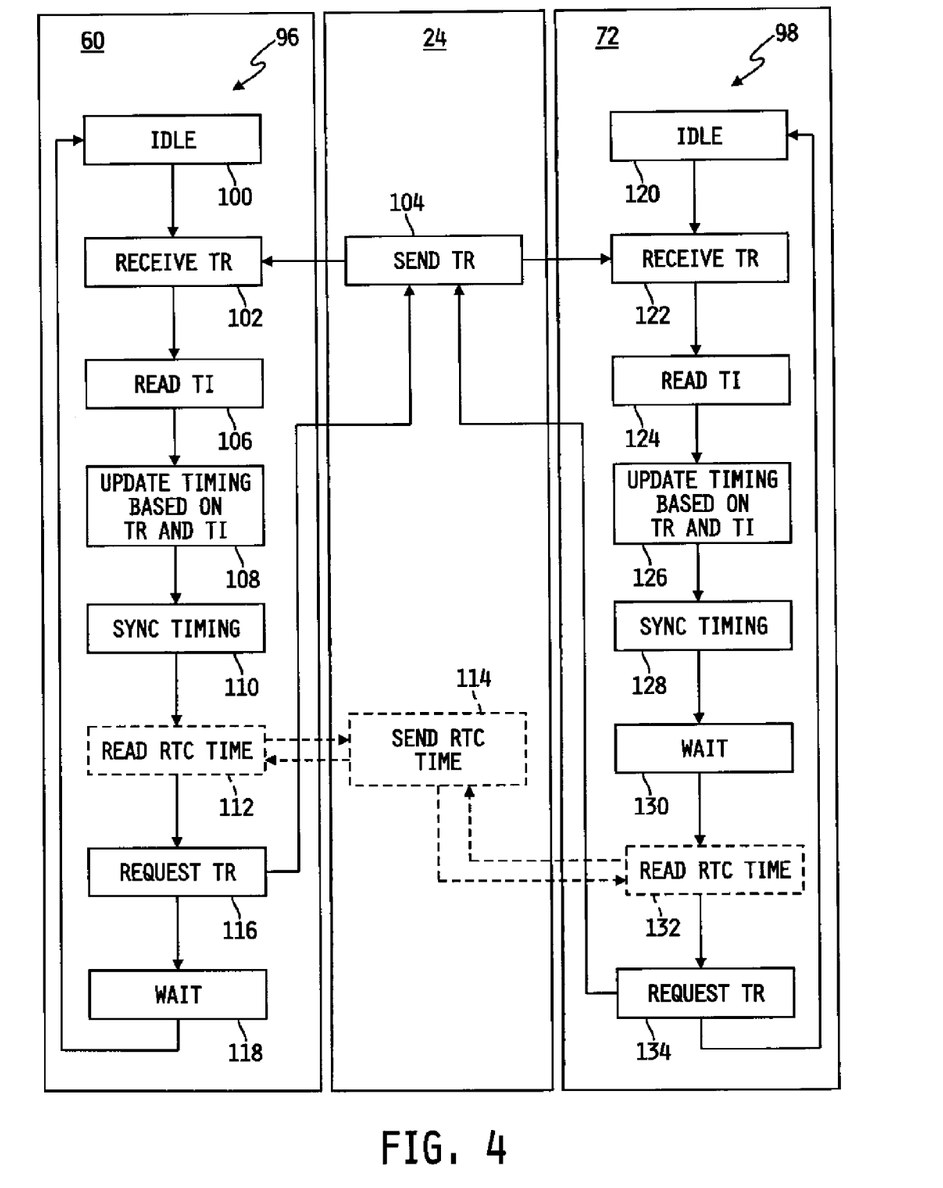
FIG. 4 is a flowchart of one illustrative embodiment of a time synchronization processes carried out by the device function module and the telemetry module using the real time clock of FIG. 1.

Referring now to FIG. 4, a flowchart is shown of one illustrative embodiment of a time synchronization processes carried out by the kernel processor 60 of the device function module 16, the kernel processor 72 of the telemetry module 20 and the real time clock circuit 24. The time synchronization process indirectly synchronizes communication between the device function module 16 and the telemetry module 20 as described above. The flowchart of FIG. 4 is partitioned into the various entities and device/electrical components that carry out the various acts of the time synchronization process.

Thus, for example, the kernel processor 60 of the device function module 16 will carry out some of the acts, the real time clock 24 will carry out some of the acts, and the kernel processor 72 of the telemetry module 20 will carry out some of the acts.

Illustratively, the time synchronization process illustrated in FIG. 4 comprises two sub-processes 96 and 98, which are carried out independently by the kernel processor 60 and the kernel processor 72 respectively. The sub-process 96, which is carried out by the kernel processor 60 of the device function module 16, begins at step 100 where the kernel processor 60 is idle. Thereafter at step 102 the kernel processor 60 receives a timing reference value, TR, sent by the real time clock circuit 24 at step 104. Following step 102, the kernel processor 60 reads its own internal timer information, TI, at step 106. Illustratively, the internal timer information of the kernel processor 60 relates to timing information associated with one or more internal timers that is/are synchronized to an internal time base. Thereafter at steps 108 and 110, the kernel processor 60 is operable to update and synchronize its internal time base and/or timer information, TI, based on the TR and TI determined at steps 102 and 106 respectively. Following step 110, the kernel processor 60 may optionally read at step 112 the real time clock time, i.e., current real time, which may be optionally supplied by the real time clock circuit 24 at step 114. Steps 112 and 114 are shown by dashed-line representation in FIG. 4 to indicate that these steps are optional. In any case, the kernel processor 60 is thereafter operable at step 116 to request another timing reference value, TR, form the real time clock circuit 24. Step 116 then advances to step 118 where the kernel processor 60 waits for a predefined time period, e.g., 1 millisecond, before looping back to step 100.

The sub-process 98, which is carried out by the kernel processor 72 of the telemetry module 20, is substantially identical to the sub-process 96 carried out by the device function module 16 with the exception of the position of the wait step within the sub-process 98. The sub-process 98 begins at step 120 where the kernel processor 72 is idle. Thereafter at step 122 the kernel processor 72 receives a timing reference value, TR, sent by the real time clock circuit 24 at step 104. Following step 122, the kernel processor 72 reads its own internal timer information, TI, at step 124. Thereafter at step 126, the kernel processor 72 is operable to update and synchronize its internal time base and/or timer information, TI, based on the TR and TI determined at steps 122 and 124 respectively. Step 128 then advances to step 130 where the kernel processor 72 waits for a predefined time period, e.g., 1 millisecond, after which the kernel processor 72 may optionally read at step 132 the real time clock time, i.e., current real time, which may be optionally supplied by the real time clock circuit 24 at step 114. Step 132 is shown by dashed-line representation in FIG. 4 to indicate that this step is optional. In any case, the kernel processor 60 is thereafter operable at step 134 to request another timing reference value, TR, form the real time clock circuit 24, after which the sub-process 98 loops back to step 120.

The sub-processes 96 and 98 are thus identical except for the position of the wait step. The kernel processor 60 requests a new time reference, TR, directly after updating and synchronizing its internal timer(s) and time base based on the previous time reference value, whereas the kernel processor 72 waits for a predefined time period after updating and synchronizing its internal timer(s) and time base before requesting a new time reference, TR. Staggering of the wait step between the processes 96 and 98 avoids real time clock circuit access conflicts between the kernel processors 60 and 72. Illustratively, the sub-processes 96 and 98 are periodically carried out by the kernel processor 60 and the kernel processor 72. In one embodiment, each are carried out approximately once per second, although this disclosure contemplates alternate embodiments in which the sub-processes 96 and 98 are carried out more or less frequently. In an alternate embodiment, the sub-processes 96 and 98 may be carried out sequentially and start with the step "request TR" 116 and 134. In this example, the kernel processors 60 and 72 will subsequently compute the start time for the exchange of information between the first and the second processor.

In one embodiment, the real time clock circuit 24 is responsive to a request for a new time reference, received at its RTR input, to set at the requested time an output pulse, e.g., from low to high or vice versa, at its time reference output, TR. Illustratively, a conventional real time clock alarm function may be used to produce this time reference output. In any case, upon receiving the time reference, TR, from the real time clock circuit 24, the kernel processors 60 and 72 are each independently operable to synchronize their internal timers to the received time reference and to also update their individual time bases. In one illustrative embodiment, the kernel processors 60 and 72 are configured to adjust their internal time bases by adjusting the speed, i.e., the frequencies, of their internal clocks. In this embodiment, the kernel processor 60 or the clock circuit 62 of the kernel processor module 52, and the kernel processor 72 or the clock circuit 76, are configured to support clock modulation. In the former cases, for example, the MSP430F2471 microcontroller has a digital controlled oscillator (DCO) which can be modulated by the setting of internal registers. In another illustrative embodiment, the kernel processors 60 and 72 are configured to adjust their internal time bases by updating their internal timing information. In this embodiment, each kernel processor 60 and 72 is configured to create an internal control loop that calculates timer settings for the next epoch based on the most timing reference, TR, most recently read from the real time clock circuit 24 and in its most recently read internal timer information, TI. As part of their internal control loops, the kernel processor 60 and the kernel processor 72 update their internal timing by updating corresponding internal timing registers. Subsequently of the control loops, the kernel processors 52 and 72 each set their internal timing registers to new values based on TI and TR, thereby synchronizing their internal timers to the timing reference, TR. In alternate embodiments, one kernel processor 60, 72 may be configured to adjust its internal time base by adjusting the speed of its internal clock as described above, while the other kernel processor 72 may be configured to adjust its internal time base by updating its internal timing information as described above.

The communication parameters used by the kernel processors 60 and 72 to conduct the actual transfer of information packets include a start of communication pulse and a communication speed or frequency. These parameters are independently derived by the kernel processors 60 and 72 from internal timers, and are not controlled or dictated by the real time clock circuit 24. Rather, the time reference information produced by the real time clock circuit 24 is independently used by each of the kernel processors 60 and 72 to adjust the internal timers such that communication between the kernel processors 60 and 72 is possible. There is no interaction between the kernel processor 60 and 72 for clock synchronization.

As described hereinabove with respect to the various described embodiments, the device function module 16 operates separately and independently from the telemetry module 20 such that the device function module 16 controls only operations associated with the electronic device excluding telemetry functions, and the telemetry module 20 controls only telemetry operations excluding any operations associated with the electronic device 12. Accordingly, no signals relating to polling requests, interrupts, triggers, synchronization or the like are sent from the device function module 16 to the telemetry module 20 and vice versa. Moreover, neither module 16, 20 alters or influences the operation of the other. In particular, the device function module 16 does not control any aspect of when and how the telemetry module 20 transmits or receives messages or information packets, and the telemetry module 20 does not control any aspect of when and how the device function module 16 processes information packets.

Figure 5:
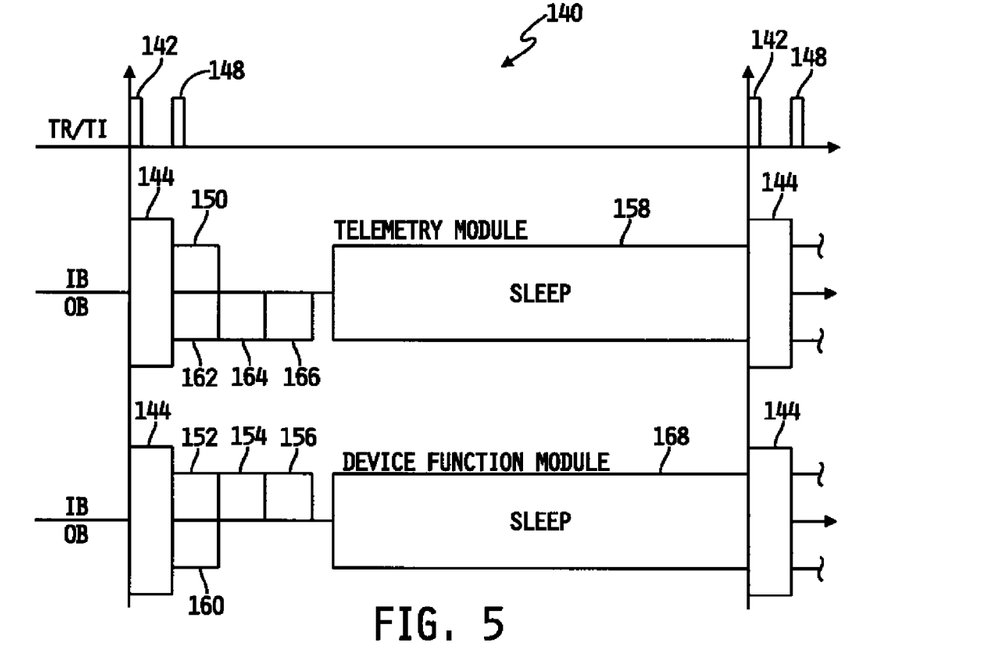
FIG. 5 is a timing diagram illustrating operation of the telemetry module and the device function module of FIG. 1 during information exchange at a normal data exchange rate.
Figure 6:
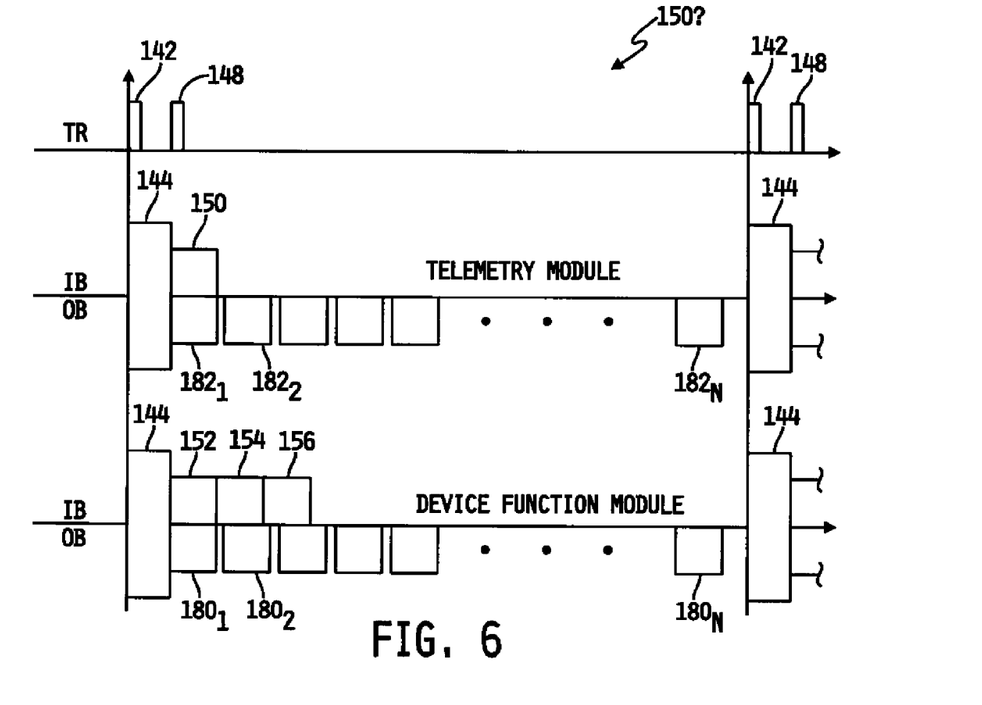
FIG. 6 is a timing diagram illustrating operation of the telemetry module and the device function module of FIG. 1 during information exchange at a high speed data exchange rate.

Referring now to FIGS. 5 and 6, timing diagrams 140 and 170 are shown illustrating operation of the device function module 16 and the telemetry module 20 during information exchange over one information packet clock cycle at a normal data exchange rate and during information exchange over one information packet clock cycle at a high speed data exchange rate. Referring specifically to FIG. 5, the kernel processor 60 of the device function module 16 and the kernel processor 72 of the telemetry module 20 are each independently responsive to the rising edge of a timing reference pulse, TR, produced by the real time clock circuit 24 to update and synchronize its internal timing information at 144, such as by using the process described hereinabove with respect to FIG. 4. The kernel processor 60 of the device function module 16 then requests a new time reference while the kernel processor 72 of the telemetry module 52 waits for a predefined time period, e.g., 1 millisecond, after which the kernel processor 72 requests a new time reference. A defined time after the assertion of the time reference 142, e.g., 5 milliseconds, on each of the modules 16, 20, an internal timer in each of the kernel processors 60, 72 generates a packet interrupt 148 that wakes up the inbound and outbound information packet transmission lines connected between the kernel processors 60 and 72 so that information packet transfers can be carried out.

For the transfer of inbound information packets, i.e., from the telemetry module 20 to the device function module 16, the kernel processor 72 of the telemetry module 20 sets the inbound information packet transmission line according to the first bit in the information packet 150 to be sent from the telemetry module 20 to the device function module 16. After the inbound information packet transmission line is stable, the line state is read by the kernel processor 60. Illustratively, the inbound information packet transmission line may be considered stable after a half bit duration elapses following the internal interrupts that were independently generated by the kernel processors 60 and 72. The bit durations are set by internal timers within the kernel processors 60 and 72, and one example bit duration that may be used is 30 microseconds. In any case, a half bit duration after information packet transmission line stability, i.e., a full bit duration following the internal interrupts that were independently generated by the kernel processors 60 and 72, the kernel processor 72 of the telemetry module 20 sets the inbound information packet transmission line according to the next bit in the information packet 150 to be sent from the telemetry module 20 to the device function module 16. This process is repeated until the last bit in the information packet 150 is read by the kernel processor 60. After the last bit in the information packet 150 is read by the kernel processor 60, the main processor 54 of the device function module 16 determines, as described above, whether the data contained in the inbound information packet is new. In FIG. 5, the inbound information packet is designated as 150 when residing in the kernel processor 72 of the telemetry module 20, and is designated as 152 when thereafter read into the kernel processor 60 of the device function module 16. In any case, if the main processor 54 determines that the data contained in the information packet 152 is new, the main processor 54 processes at 154 the new data contained in the information packet 152 and then writes any resulting data or commands to the kernel, i.e., to the kernel processor 60, at 156 for transmission during the next information packet transfer cycle.

For the transfer of outbound information packets, i.e., from the device function module 16 to the telemetry module 20, the kernel processor 60 of the device function module 16 sets the outbound information packet transmission line according to the first bit in the information packet 160 to be sent from the device function module 16 to the telemetry module 120 following the internal interrupts generated by each of the kernel processors 60 and 72. After the outbound information packet transmission line is stable, the line state is read by the kernel processor 72. Illustratively, the outbound information packet transmission line may be considered stable after a half bit duration elapses following the internal interrupts that were independently generated by the kernel processors 60 and 72 as described above. One half bit duration after information packet transmission line stability, i.e., a full bit duration following the internal interrupts that were independently generated by the kernel processors 60 and 72, the kernel processor 60 of the device function module 16 sets the outbound information packet transmission line according to the next bit in the information packet 160 to be sent from the device function module 16 to the telemetry module 20. This process is repeated until the last bit in the information packet 160 is read by the kernel processor 72. After the last bit in the information packet 160 is read by the kernel processor 72, the communication processor 74 of the telemetry module 20 determines, as described above, whether the data contained in the outbound information packet is new. In FIG. 5, the outbound information packet is designated as 160 when residing in the kernel processor 60 of the device function module 16, and is designated as 162 when thereafter read into the kernel processor 72 of the telemetry module 20. In any case, if the communication processor 74 determines that the data contained in the information packet 162 is new, the communication processor 74 packs the information packet at 164 into the wireless communication protocol and transmits at 166 the packet wirelessly to the electronic device 14. Following the inbound and outbound information packet transfers, the kernel processors 72 and 60 enter sleep states 158 and 168 respectively until the next information packet transfer cycle.

Multiple inbound and/or outbound information packets may alternatively be transmitted at higher data rates. Referring to FIG. 6, for example, a timing diagram 170 is shown illustrating operation of the device function module 16 and the telemetry module 20 during the transfer of multiple outbound information packets from the device function module 16 to the telemetry module 20 over one information packet clock cycle at a high speed data exchange rate. In the illustrated example, a single input information packet 150 is transferred from the telemetry module 20 to the device function module 16, and is thereafter read, processed and acted upon at 152, 154 and 156 as just described with respect to FIG. 5. At the same time, a number, N, of outbound information packets $180_1$-$180_N$, may be transferred from the device function module 16 to the telemetry module 20 (after which time they are designated $182_1$-$182_N$) using the same process but at a high rate of data transfer, where N may be any positive integer. Using the example parameters described above, in which the bit duration is 30 microseconds, the wait time period is 1 millisecond, the duration between TR 142 and TI 148 is approximately 5 milliseconds and the total information packet transfer cycle is approximately 1 second in duration, N=19 and a total of 19 inbound and/or outbound information packets may be transferred between the device function module 16 and the telemetry module 20 during one information packet transfer cycle.

Figure 7:
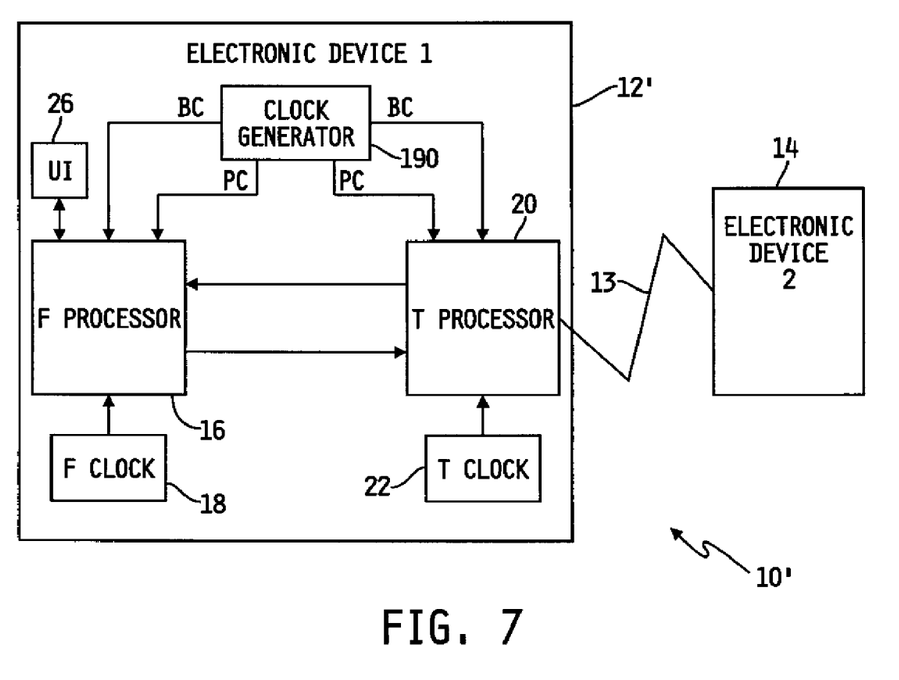
FIG. 7 is a diagram of another illustrative embodiment of a wireless communication system configured for wireless communications between two separate electronic devices.

Referring now to FIG. 7, a diagram of another illustrative embodiment of a wireless communication system 10' is shown that is configured for wireless communications between two separate electronic devices 12' and 14. The system 10' illustrated in FIG. 7 is identical in many respects to the system 10 illustrated in FIG. 1, and like numbers are therefore used to identify like components. The system 10' differs from the system 10 illustrated in FIG. 1 primarily in that the electronic device 12' includes a clock generator circuit 190 in place of the real time clock circuit 24 of the electronic device 12. It should be clear to those skilled in the art that the high data rate of data transfer can take place from the device function module 16 to the telemetry module 20 and vice versa.

The device function module 16 and the telemetry module 20 of the electronic device 12' are illustratively identical to the modules 16 and 20 illustrated and described with respect to FIGS. 1 and 3. Moreover, the operation of the device function module 16 and of the telemetry module 20 in the electronic device 12' is identical to that described hereinabove with respect to the electronic device 12 in that the device function module 16 and the telemetry module 20 are configured to constantly communicate with each other via a kernel 28 according to the process illustrated in FIG. 2.

Figure 8:
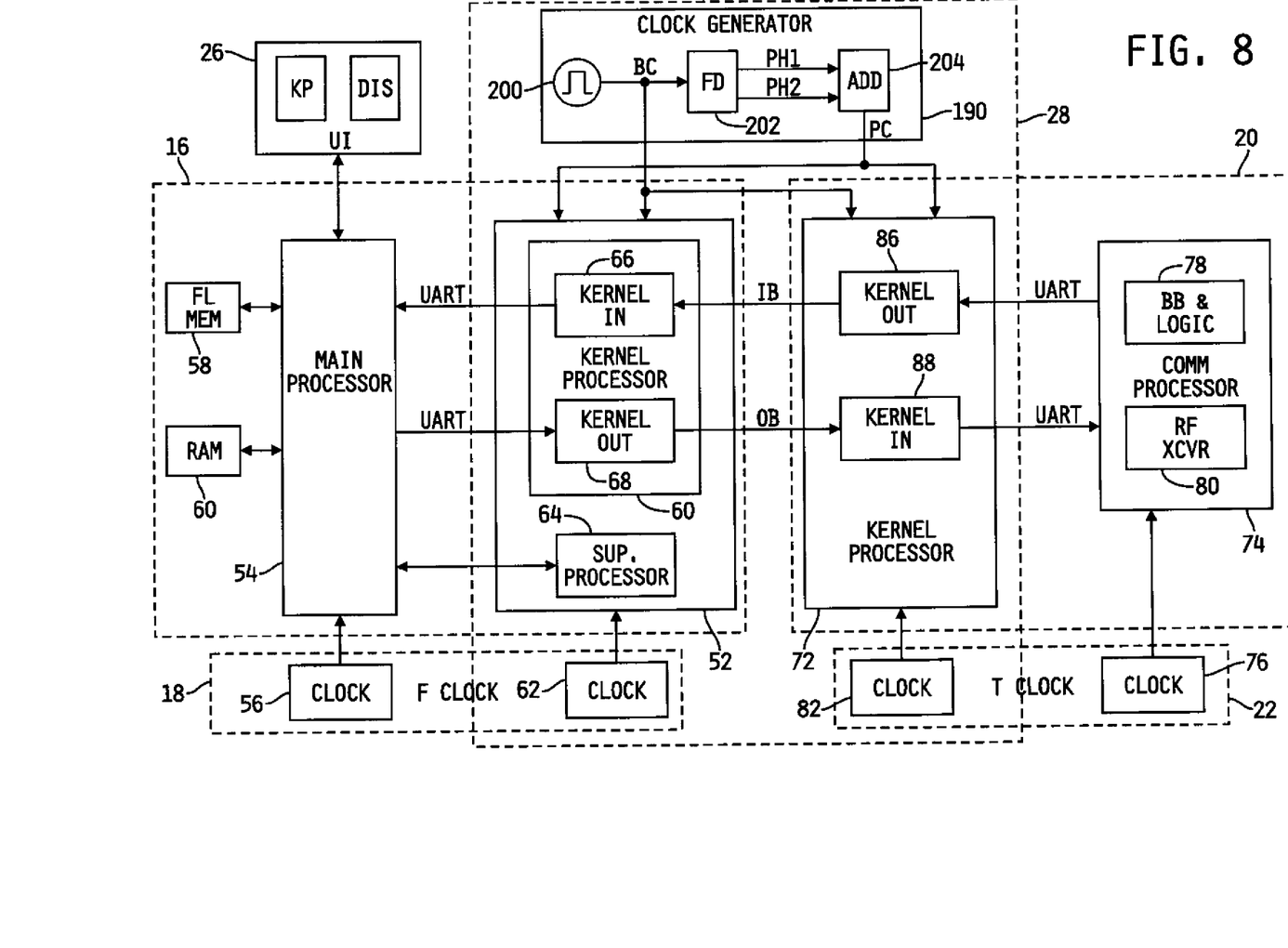
FIG. 8 is a diagram of one illustrative embodiment of the device function module, the telemetry module and the clock generator circuit of FIG. 7.

Referring now to FIG. 8, the communication kernel 28 in this embodiment includes the clock generator circuit 190 in place of the real time clock circuit 24, and in the illustrated embodiment the clock generator circuit 190 includes a conventional oscillator circuit 200 that is configured to produce a periodic bit clock signal, BC, at a desired frequency. In one illustrative embodiment, the oscillator circuit 200 is a model EM 1564 crystal oscillator circuit that is commercially available from EM Microelectronic, and is configured to produce a periodic square wave clock signal operating at 32.768 kHz, although the oscillator circuit 200 may be alternatively configured to produce non-square wave clock signals and/or to produce clock signals at other clock frequencies. In any case, the clock generator circuit 190 further includes a frequency divider 202 that is illustratively configured to receive the clock signal produced by the oscillator circuit 200, to divide the frequency of the received clock signal and produce two inversely phased clock signals PH1 and PH2. In one example embodiment in which the frequency of the clock signal generated by the oscillator circuit 200 is 32.768 kHz, the frequency divider 202 is a model CD4521B 24-stage frequency divider that is commercially available from Texas Instruments, and that is configured to divide the clock signal by 65536 ($2^{16}$) and produce two resulting 0.5 Hz clock signals PH1 and PH2; one at zero degrees phase and the other at 180 degrees phase. The clock generator 190 in this embodiment further includes an ADD circuit 204 that sums PH1 and PH2 to produce a 1 Hz (1 cycle/second) packet clock signal, PC. In alternative embodiments, the clock generator circuit 190 may implemented using other conventional circuits and/or configurations that produce the bit clock, BC, and the packet clock, PC, at the example clock rates, or that produce the bit clock, BC, and/or the packet clock, PC, at other clock rates that may be suitable for the particular application and/or that produce the bit clock, BC, and the packet clock, PC, using separate clock generating circuits. Whereas the latter embodiment may produce clock signals that may drift in time relative to each other, data integrity may be checked using a conventional checksum technique, such as a cyclic redundancy check (CRC).

The electronic device 12' differs in it operation from the electronic device 12 of FIGS. 1-6 in that the communication process, i.e., the transfer of inbound and outbound information packets, between the device function module 16 and the telemetry module 20 is regulated solely by the clock signals produced by the clock generator circuit 190. As described above, the communication parameters used by the kernel processors 60 and 72 to conduct the actual transfer of information packets include a start of communication pulse and a communication speed or frequency. In the embodiment illustrated in FIGS. 7 and 8, the start of the communication pulse is the packet clock signal, PC, and the communication speed or frequency is the bit clock, BC. In the electronic device 12 illustrated and described with respect to FIGS. 1-6, these parameters are independently derived by the kernel processors 60 and 72 from internal timers, and are not controlled or dictated or regulated by the real time clock circuit 24. In the electronic device 12', in contrast, no internal timing information or time base within the kernel processor 60 or the kernel processor 72 is modified in the electronic device 12', and instead the kernel processor 60 and the kernel processor 72 control the actual transfer of inbound and outbound information packets based on the bit clock signal, BC, each transition (e.g., low to high or high to low) of which corresponds to a new bit of data, and the packet clock signal, PC, each transition (e.g., low to high or high to low) of which corresponds to a new information packet, generated by the clock generator circuit 190. The bit clock, BC, and the packet clock, PC, are continuously free running, and the operation of the clock generator circuit 190 is independent of the state and operation of either of the device function module 16 and the telemetry module 20. Operation of the telemetry module 20 is therefore maintained separate and independent from the operation of the device function module 16 so that all device function operations associated with the electronic device 12', excluding telemetry operations, are controlled solely by the device function module 16 and all telemetry operations associated with the electronic device 12', excluding all device function operations, are controlled solely by the telemetry module 20.

Figure 9:
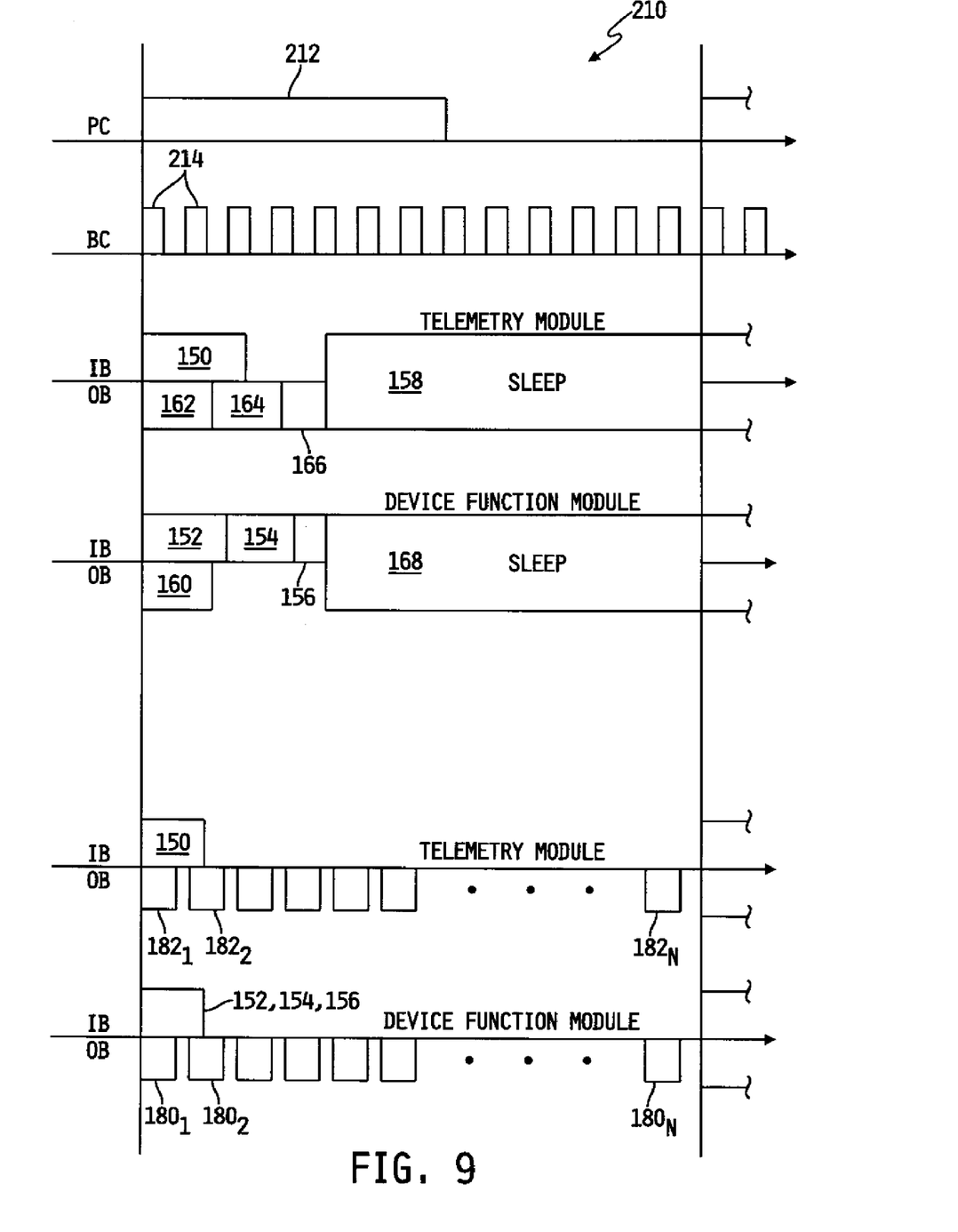
FIG. 9 is a timing diagram illustrating operation of the telemetry module, the device function module and the clock generator circuit during information exchange at a normal data exchange rate and during information exchange at a high speed data exchange rate.

Referring now to FIG. 9, a timing diagram 210 is shown illustrating operation of the telemetry module 20, the device function module 16 and the clock generator circuit 190 during information exchange at a normal data exchange rate and during information exchange at a high speed data exchange rate. Some of the timing features of the diagram 210 are identical or similar to those illustrated in FIGS. 5 and 6, and like numbers are therefore used to identify like features. In the illustrated timing diagram, the rising edge of the packet clock, PC, 212 indicates the start of a new information packet, and the rising edges of the bit clock, BC, 214 indicate the start of transfer of a new bit of data.

At the rising edge of the packet clock, PC, the kernel processors 60 and 72 wake up, and at the next rising edge of the bit clock, BC, the inbound and outbound information packet transmission lines are set by the kernel processors 60 and 72 according to the first bits in the inbound and outbound data packets 150 and 160 respectively. In this embodiment, the inbound and outbound data packets may be variable length since the packet clock signal, PC, and the bit clock signal, BC, are each preset in time. In any case, after the inbound and outbound information packet transfer lines are stable, e.g., at the falling edge of the bit clock, BC, the states of the inbound and outbound information packet transmission lines are read by the kernel processors 60 and 72 respectively. At the next rising edge of the bit clock, BC, the inbound and outbound information packet transmission lines are again set by the kernel processors 60 and 72 according to the next bits in the inbound and outbound data packets 150 and 160 respectively, and after transmission line stabilization the states of the inbound and outbound information packet transmission lines are again read by the kernel processors 60 and 72 respectively. This process is repeated until the inbound and outbound information packets 150 and 160 are read by the kernel processors 60 and 72 respectively, after which they are designated in FIG. 9 as information packets 152 and 162 respectively. After the information packets 152 and 162 are processed at 154, 156, 164 and 166 as described above, the telemetry module 72 and the device function module 60 enter sleep states 158 and 168 respectively until the next information packet transfer cycle.

Multiple inbound and/or outbound information packets may alternatively be transmitted at higher data rates as described hereinabove with respect to FIG. 6. In the example illustrated in FIG. 9, a single input information packet 150 is transferred from the telemetry module 20 to the device function module 16, and is thereafter read, processed and acted upon at 152, 154 and 156 as just described in relation to the packet clock signal, PC, and the bit clock signal, BC. At the same time, a number, N, of outbound information packets $180_1$-$180_N$, may be transferred from the device function module 16 to the telemetry module 20 (after which time they are designated $182_1$-$182_N$) using the same process but at a high rate of data transfer, where N may be any positive integer. Using the example parameters described above, N=19 and a total of 19 inbound and/or outbound information packets may be transferred between the device function module 16 and the telemetry module 20 during one information packet transfer cycle. It should be clear to those skilled in the art that the high data rate of data transfer can take place from the device function module 16 to the telemetry module 20 and vice versa.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An electronic device for processing information wirelessly received from another electronic device or to be wirelessly sent to the another electronic device, the electronic device comprising:
    a first processor that controls only wireless communications with the another electronic device and excluding operations associated only with the electronic device,
    a first clock circuit electrically connected to the first processor, the first clock circuit controlling timing of operation of the first processor,
    a second processor that controls the operations associated only with the electronic device and excluding the wireless communications with the another device,
    a second clock circuit electrically connected to the second processor, the second clock circuit controlling timing of operation of the second processor, the first and second clock circuits separate from and independent of each other such that the timing of operation of the first processor is separate from and independent of the timing of operation of the second processor, and
    a third clock circuit electrically connected directly to each of the first and second processors, the third clock circuit separate and independent from the first and second clock circuits and from the first and second processors, the third clock circuit producing at least one timing signal that regulates synchronous exchange of the information between the first and second processors.

2. An electronic device for processing information wirelessly received from another electronic device or to be wirelessly sent to the another electronic device, the electronic device comprising:
    a first processor that controls only wireless communications with the another electronic device and excluding operations associated only with the electronic device,
    a second processor that controls the operations associated only with the electronic device and excluding the wireless communications with the another device, the first and second processors each comprising internal timing information, one or more internal timers and a time base, and
    a real time clock circuit that is separate and independent from the first and second processors and that produces at least one timing signal including a timing reference signal that regulates synchronous exchange of the information between the first and second processors,
    wherein the first and second processors each synchronize their internal timing information to the timing reference signal,
    and wherein the first and second processors each update their one or more internal timers and time base with the timing reference signal prior to synchronizing their internal timing information to the timing reference signal.

3. An electronic device for processing information wirelessly received from another electronic device or to be wirelessly sent to the another electronic device, the electronic device comprising:
    a first processor that controls only wireless communications with the another electronic device and excluding operations associated only with the electronic device,
    a second processor that controls the operations associated only with the electronic device and excluding the wireless communications with the another device, the first and second processors each comprise internal timing information, and
    a real time clock circuit that is separate and independent from the first and second processors and that produces at least one timing signal including a timing reference signal that regulates synchronous exchange of the information between the first and second processors,
    wherein the first and second processors each synchronize their internal timing information to the timing reference signal, and
    wherein the first and second processors are each configured to request the timing reference signal from the real time clock circuit prior to exchange of the information between the first and second processors.

4. The electronic device of claim 3 wherein the first and second processors are each configured to request the timing reference signal at different instants in time relative to each other.

5. An electronic device for processing information wirelessly received from another electronic device or to be wirelessly sent to the another electronic device, the electronic device comprising:

a first processor that controls only wireless communications with the another electronic device and excluding operations associated only with the electronic device, a second processor that controls the operations associated only with the electronic device and excluding the wireless communications with the another device, and a clock generator that is separate and independent from the first and second processors and that produces at least one timing signal including at least one clock signal that regulates synchronous exchange of the information between the first and second processors, wherein the first and second processors each exchange the information according to the at least one clock signal, and wherein the information exchanged between the first and second processors comprises one or more information packets that each includes a number of data bits, and wherein the at least one clock signal comprises a data bit clock signal by which each of the number of data bits of an information packet is exchanged between the first and second processors, and wherein the at least one timing signal further includes an information packet clock signal by which each information packet is exchanged between the first and second processors.

6. The electronic device of claim 1 wherein the first processor comprises:

a communication processor that controls wireless communications with the another electronic device, and a first kernel processor that exchanges information between the communication processor and the second processor according to the at least one timing signal.

7. The electronic device of claim 6 wherein the second processor comprises:

a main processor that controls the operations associated only with the electronic device, and a second kernel processor that exchanges information between the main processor and the first kernel processor according to the at least one timing signal.

8. The electronic device of claim 2 wherein the first processor comprises:

a communication processor that controls wireless communications with the another electronic device, and a first kernel processor that exchanges information between the communication processor and the second processor according to the at least one timing signal.

9. The electronic device of claim 8 wherein the second processor comprises:

a main processor that controls the operations associated only with the electronic device, and a second kernel processor that exchanges information between the main processor and the first kernel processor according to the at least one timing signal.

10. The electronic device of claim 3 wherein the first processor comprises:

a communication processor that controls wireless communications with the another electronic device, and a first kernel processor that exchanges information between the communication processor and the second processor according to the at least one timing signal.

11. The electronic device of claim 10 wherein the second processor comprises:

a main processor that controls the operations associated only with the electronic device, and a second kernel processor that exchanges information between the main processor and the first kernel processor according to the at least one timing signal.

12. The electronic device of claim 5 wherein the first processor comprises:

a communication processor that controls wireless communications with the another electronic device, and a first kernel processor that exchanges information between the communication processor and the second processor according to the at least one timing signal.

13. The electronic device of claim 12 wherein the second processor comprises:

a main processor that controls the operations associated only with the electronic device, and a second kernel processor that exchanges information between the main processor and the first kernel processor according to the at least one timing signal.

14. The electronic device of claim 1 wherein the third clock circuit is a real time clock circuit.

15. The electronic device of claim 14 wherein the first and second processors each independently align their respective timing of operation with the timing signal produced by the real time clock circuit to synchronize exchange of the information between the first and second processors.

16. The electronic device of claim 1 wherein the third clock circuit is a clock generator.

17. The electronic device of claim 16 wherein the first and second processors synchronously exchange the information with each other based on the timing signal produced by the clock generator and independently of their respective timing of operation.

* * * * *